United States Patent
Lin et al.

(10) Patent No.: US 12,475,953 B2
(45) Date of Patent: Nov. 18, 2025

(54) CONTROL CIRCUIT AND CONTROL METHOD THEREOF

(71) Applicant: Nuvoton Technology Corporation, Hsinchu Science Park (TW)

(72) Inventors: Wei-Ling Lin, Jhubei (TW); Chia-Hao Huang, Hsinchu Science Park (TW); Tsun-Yao Fan, Taipei (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 28 days.

(21) Appl. No.: 18/401,467

(22) Filed: Dec. 30, 2023

(65) Prior Publication Data
US 2024/0404603 A1  Dec. 5, 2024

(30) Foreign Application Priority Data

May 31, 2023 (TW) ................................. 112120206

(51) Int. Cl.
*G11C 16/22* (2006.01)
*G11C 16/14* (2006.01)

(52) U.S. Cl.
CPC .............. *G11C 16/22* (2013.01); *G11C 16/14* (2013.01)

(58) Field of Classification Search
CPC ........... G11C 16/22; G11C 16/14; G11C 7/24; G11C 16/10; G11C 8/12
See application file for complete search history.

(56) References Cited

U.S. PATENT DOCUMENTS

| | | | | |
|---|---|---|---|---|
| 6,026,016 A | * | 2/2000 | Gafken | G11C 16/22 |
| | | | | 711/E12.1 |
| 2005/0257097 A1 | * | 11/2005 | Jarvis | G06F 11/1435 |
| | | | | 714/42 |
| 2014/0258599 A1 | * | 9/2014 | Rostoker | G06F 3/0679 |
| | | | | 711/163 |
| 2020/0194083 A1 | * | 6/2020 | Wang | G06F 3/0679 |
| 2024/0094932 A1 | * | 3/2024 | Kantani | G06F 3/0644 |

FOREIGN PATENT DOCUMENTS

| | | |
|---|---|---|
| TW | 440848 B | 6/2001 |
| TW | 200844842 A | 11/2008 |
| TW | 202112114 A | 3/2021 |

OTHER PUBLICATIONS

Office Action issued on Feb. 27, 2024, for the corresponding application No. 112120206 in Taiwan.

* cited by examiner

*Primary Examiner* — Nanci N Wong
(74) *Attorney, Agent, or Firm* — MUNCY, GEISSLER, OLDS & LOWE, P.C.

(57) ABSTRACT

A control circuit including a storage circuit, a register, and a write protection logic circuit is provided. The storage circuit stores data, an enable-set value and a mode-set value. The register stores a protection-set value. The write protection logic circuit determines whether to change at least one of the enable-set value, the mode-set value, and the protection-set value according to the mode-set value after receiving a write command. In response to the mode-set value matching a pre-determined value, the write protection logic circuit changes at least one of the enable-set value, the mode-set value, and the protection-set value according to the protection-set value. In response to the mode-set value not matching the pre-determined value, the write protection logic circuit does not change the enable-set value and the mode-set value.

20 Claims, 3 Drawing Sheets

CONTROL CIRCUIT AND CONTROL METHOD THEREOF

CROSS REFERENCE TO RELATED APPLICATIONS

This Application claims priority of Taiwan Patent Application No. 112120206, filed on May 31, 2023, the entirety of which is incorporated by reference herein.

BACKGROUND OF THE INVENTION

Field of the Invention

The present invention relates to a control circuit, and, in particular, to a control circuit that provides a security protection function.

Description of the Related Art

There are generally two types of computer memory: volatile memory and non-volatile memory. Non-volatile memory comprises read-only memory (ROM), programmable read-only memory (PROM), erasable programmable read-only memory (EPROM), and flash memory. Volatile memory comprises static random-access memory (SRAM) and dynamic random-access memory (DRAM).

However, regardless of whether it is volatile memory or non-volatile memory, the user may mistakenly change the data stored in the memory, causing the memory to store incorrect data. Additionally, the data stored in the memory may also be maliciously tampered with.

BRIEF SUMMARY OF THE INVENTION

In accordance with an embodiment of the disclosure, a control circuit comprises a storage circuit, a register, and a write protection logic circuit. The storage circuit stores data, an enable-set value and a mode-set value. The register stores a protection-set value. The write protection logic circuit determines whether to change at least one of the enable-set value, the mode-set value, and the protection-set value according to the mode-set value after receiving a write command. In response to the mode-set value matching a pre-determined value, the write protection logic circuit changes at least one of the enable-set value, the mode-set value, and the protection-set value according to the protection-set value. In response to the mode-set value not matching the pre-determined value, the write protection logic circuit does not change the enable-set value and the mode-set value.

A control method for a write protection logic circuit to adjust at least one of an enable-set value, a mode-set value, and a protection-set value is provided. The enable-set value and the mode-set value are stored in a storage circuit. The protection-set value is stored in a register which is independent of the storage circuit. An exemplary embodiment of a control method is described in the following paragraph. An input command is received and decoded. In response to the input command being a write command, the mode-set value is read. A determination is made as to whether the mode-set value matches a pre-determined value. In response to the mode-set value matching the pre-determined value, at least one of the enable-set value, the mode-set value, and the protection-set value is changed according to the write command and the protection-set value. In response to the mode-set value not matching the pre-determined value, the enable-set value and the mode-set value are maintained.

Control methods may be practiced by the systems which have hardware or firmware capable of performing particular functions and may take the form of program code embodied in a tangible media. When the program code is loaded into and executed by an electronic device, a processor, a computer or a machine, the electronic device, the processor, the computer or the machine becomes a control circuit and a write protection logic circuit for practicing the disclosed method.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
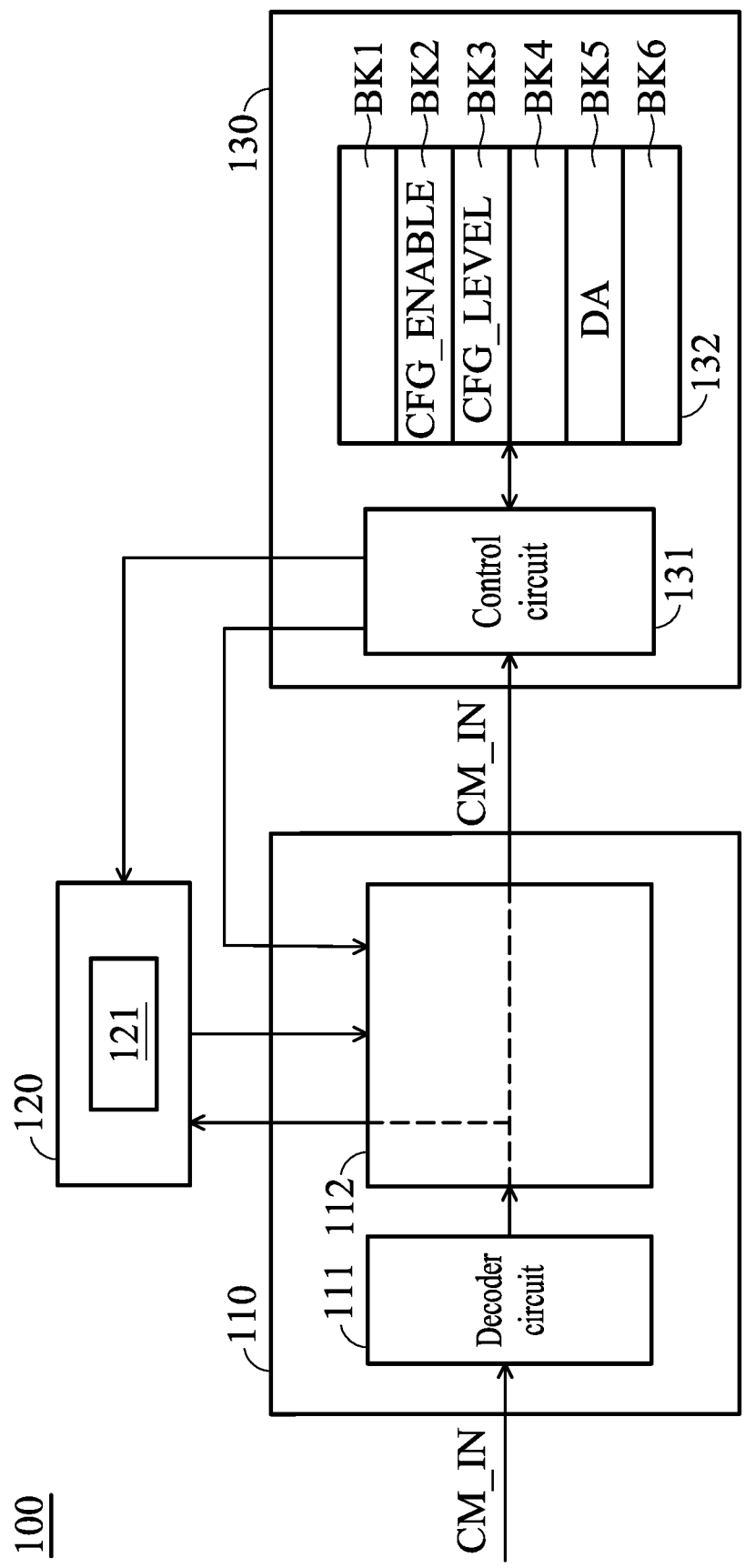
FIG. 1A is a schematic diagram of an exemplary embodiment of a control circuit, in accordance with some embodiments.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1A is a schematic diagram of an exemplary embodiment of a control circuit, in accordance with some embodiments. The control circuit 100 comprises a write protection logic circuit 110, a register 120, and a storage circuit 130. The storage circuit 130 stores an enable-set value CFG_ENABLE, a mode-set value CFG_LEVEL and data DA. The structure of storage circuit 130 is not limited in the present disclosure. In one embodiment, the storage circuit 130 comprises a control circuit 131 and a memory array 132.

The type of memory array 132 is not limited in the present disclosure. In some embodiments, the memory array 132 is a non-volatile memory (NVM). In this embodiment, the memory array 132 comprises memory blocks BK1~BK6, but the disclosure is not limited thereto. In other embodiments, the memory array 132 comprises more memory blocks or fewer memory blocks.

The memory block BK2 stores the enable-set value CFG_ENABLE. The enable-set value CFG_ENABLE indicates which memory blocks of the memory array 132 are protected. In this embodiment, the control circuit 131 copies the enable-set value CFG_ENABLE to the register 120 to serve as a protection-set value 121.

The memory block BK3 stores the mode-set value CFG_LEVEL. The mode-set value CFG_LEVEL indicates the operation mode of the write protection logic circuit 110. In this embodiment, the write protection logic circuit 110 operates in a corresponding protection mode according to the mode-set value CFG_LEVEL.

The memory block BK5 stores the data DA. In some embodiments, the control circuit 131 accesses the data DA according to an input command CM_IN. For example, when the input command CM_IN is a read command, the control circuit 131 enters a read mode. In the read mode, the control circuit 131 reads the corresponding memory block (e.g., the memory block BK5) according to the address information of the input command CM_IN. When the input command CM_IN is a write command, the control circuit 131 enters a write mode. In the write mode, the control circuit 131 writes the data information of the input command CM_IN to a corresponding memory block (e.g., the memory block BK5) according to the address information of the input command CM_IN.

The present disclosure does not limit which memory block stores the enable-set value CFG_ENABLE and the mode-set value CFG_LEVEL. In some embodiments, the enable-set value CFG_ENABLE and the mode-set value CFG_LEVEL are stored in the same memory block. In other embodiments, the enable-set value CFG_ENABLE and the mode-set value CFG_LEVEL are binary values. Each of the enable-set value CFG_ENABLE and the mode-set value CFG_LEVEL may comprise a plurality of bits.

In one embodiment, when a specific event occurs, the control circuit 131 enters an erase mode. In the erase mode, the control circuit 131 performs an erase operation, such as a mass erase operation to erase the data stored in the memory blocks BK1~BK6. After finishing the erase operation, the enable-set value CFG_ENABLE is equal to a first initial value, and the mode-set value CFG_LEVEL is equal to a second initial value. In this case, the control circuit 131 changes the enable-set value CFG_ENABLE and the mode-set value CFG_LEVEL according to the input command CM_IN.

The register 120 stores the protection-set value 121. In this embodiment, the register 120 is independent of the storage circuit 130. When the control circuit 100A is powered off, the protection-set value 121 stored in the register 120 is cleared. Therefore, the control circuit 131 copies the enable-set value CFG_ENABLE stored in the memory block BK2 to the register 120 to serve as a new protection-set value 121 after the control circuit 100 is powered on.

The write protection logic circuit 110 reads the mode-set value CFG_LEVEL stored in the memory block BK3 via the control circuit 131 and enters the corresponding protection mode according to the mode-set value CFG_LEVEL. For example, when the mode-set value CFG_LEVEL matches a first pre-determined value, the write protection logic circuit 110 enters a first protection mode. In the first protection mode, the write protection logic circuit 110 changes at least one of the mode-set value CFG_LEVEL, enable-set value CFG_ENABLE, and the protection-set value 121 according to the input command CM_IN.

For example, in the first protection mode, when the input command CM_IN is a write command and the address information of the write command corresponds to the register 120, the write protection logic circuit 110 changes the protection-set value 121 according to the data information of the input command CM_IN. In one embodiment, the write protection logic circuit 110 writes the data information of the input command CM_IN to the register 120 to replace the protection-set value 121. When the address information of the input command CM_IN corresponds to the memory block BK2 OR BK3, THE write protection logic circuit 110 provides the input command CM_IN to the storage circuit 130. The control circuit 131 changes the enable-set value CFG_ENABLE or mode-set value CFG_LEVEL according to the data information of the input command CM_IN.

In another embodiment, in the first protection mode, when the input command CM_IN is a write command and the address information of the input command CM_IN corresponds to the memory block BK2 or BK3, the write protection logic circuit 110 determines whether to changes the enable-set value CFG_ENABLE or the mode-set value CFG_LEVEL according to the protection-set value 121.

Taking the enable-set value CFG_ENABLE as an example, assume that the address information of the input command CM_IN corresponds to the memory block BK2. In this case, the write protection logic circuit 110 determines whether the protection-set value 121 matches a first specific value. When the protection-set value 121 matches the specific value, this indicates that the memory block BK2 is protected. Therefore, the write protection logic circuit 110 does not provide the input command CM_IN to the storage circuit 130. When the protection-set value 121 does not match the first specific value, this indicates that the memory block BK2 is not protected. Therefore, the write protection logic circuit 110 provides the input command CM_IN to the storage circuit 130. The control circuit 131 changes the enable-set value CFG_ENABLE according to the address information and the data information of the input command CM_IN.

Additionally, in the first protection mode, the write protection logic circuit 110 determines whether to changes the data stored in the memory blocks BK1 and BK4~BK6 according to the protection-set value 121. For example, assume that the protection-set value 121 indicates that the memory block BK5 is a protected block. In this embodiment, since the memory blocks BK1, BK4, and BK6 are un-protected blocks, when the input command CM_IN is a write command and points to the memory block BK1, BK4 or BK6, the write protection logic circuit 110 provides the input command CM_IN to the storage circuit 130. The control circuit 131 changes the data stored in the memory block BK1, BK4 or BK6 according to the data information of the input command CM_IN. However, when the address information of the input command CM_IN points to the memory block BK5, since the memory block BK5 is a protected block, the write protection logic circuit 110 does not provide the input command CM_IN to the storage circuit 130. Since the control circuit 131 does not change the data DA, the integrity of data DA is protected to prevent users from accidentally rewriting the data DA and to prevent the data DA from malicious tampering.

In other embodiments, when the mode-set value CFG_LEVEL does not match a first pre-determined value, the write protection logic circuit 110 does not change the enable-set value CFG_ENABLE and the mode-set value CFG_LEVEL. At this time, even if the address information of the input command CM_IN points to the memory block BK2 or BK3, the write protection logic circuit 110 does not provide the input command CM_IN to the storage circuit 130. Therefore, the storage circuit 130 maintains the enable-set value CFG_ENABLE and the mode-set value CFG_LEVEL. In this case, the write protection logic circuit 110 determines whether to changes the data stored in the memory blocks BK1, and BK4~BK6 according to the protection-set value 121. For example, assume that the protection-set value 121 indicates that the memory block BK5 is a protected block. In this case, since the memory blocks BK1, BK4 and BK6 are un-protected blocks, when the address information of the input command CM_IN points to the memory block BK1, BK4 or BK6, the write protection logic circuit 110 provides the input command CM_IN to the storage circuit 130. The control circuit 131 changes the data stored in the pointed memory block BK1, BK4 or BK6 according to the input command CM_IN. When the address information of the input command CM_IN points to the memory block BK5, since the memory block BK5 is a protected block, the write protection logic circuit 110 does not provide the input command CM_IN to the storage circuit 130. Therefore, the control circuit 131 maintains the data DA.

In some embodiments, when the input command CM_IN points to the storage circuit 130, the write protection logic circuit 110 directly provides the input command CM_IN to the storage circuit 130, the write protection logic circuit 110 directly provides the input command CM_IN to the control circuit 131. The control circuit 131 decodes the input command CM_IN to obtain the address information and the data information. Then, the control circuit 131 changes the data stored in the corresponding memory block BK according to the address information and the data information of the input command CM_IN. In another embodiment, when the input command CM_IN is a read command, the control circuit 131 read and outputs the data stored in the corresponding memory block BK according to the address information of the input command CM_IN.

In other embodiments, when the mode-set value CFG_LEVEL does not match the first pre-determined value, the write protection logic circuit 110 determines whether the mode-set value CFG_LEVEL matches a second pre-determined value different from the first pre-determined value. When the mode-set value CFG_LEVEL matches the second pre-determined value, the write protection logic circuit 110 enters a second protection mode.

In the second protection mode, the write protection logic circuit 110 does not change the enable-set value CFG_ENABLE, the mode-set value CFG_LEVEL, and the protection-set value 121. In this mode, even if the address information of the input command CM_IN points to the register 120, the memory block BK2, or the memory block BK3, the write protection logic circuit 110 does not change the protection-set value 121 and does not provide the input command CM_IN to the storage circuit 130. Therefore, the data stored in the register 120 and the memory blocks BK2 and BK3 are protected.

When a specific event occurs, the control circuit 131 enters an erase mode. In the erase mode, the control circuit 131 erases the memory blocks BK1~BK6. Since the mode-set value CFG_LEVEL stored in the memory block BK3 does not match the second pre-determined value, the write protection logic circuit 110 exits the second protection mode. In some embodiments, the mode-set value CFG_LEVEL is equal to a first initial value after the control circuit 131 erases the memory block BK3. Therefore, the write protection logic circuit 110 enters the first protection mode.

The structure of write protection logic circuit 110 is not limited in the present disclosure. In one embodiment, the write protection logic circuit 110 comprises a decoder circuit 111 and a determination circuit 112. The decoder circuit 111 decodes the input command CM_IN to obtain the type of input command CM_IN, such as a read command or a write command. The decoder circuit 111 further obtains the address information and the data information after decoding the input command CM_IN. The structure of decoder circuit 111 is not limited in the present disclosure. Any circuit can serve as the decoder circuit 111, as long as the circuit is capable of decoding commands.

The determination circuit 112 operates in a corresponding protection mode according to the mode-set value CFG_LEVEL. For example, when the mode-set value CFG_LEVEL matches a first pre-determined value, the determination circuit 112 operates a first protection mode. In the first protection mode, when the input command CM_IN is a write command, the determination circuit 112 changes the mode-set value CFG_LEVEL, the enable-set value CFG_ENABLE or the protection-set value 121 according to the address information of the write command. For example, when the address information of the write command points to the register 120, the determination circuit 112 changes the protection-set value 121 according to the data information of the write command. When the address information of the write command points to the memory block BK2 or BK3, the determination circuit 112 provides the input command CM_IN to the storage circuit 130 to change the data stored in the memory block BK2 or BK3.

In other embodiments, in the first protection mode, the determination circuit 112 determines whether the protection-set value 121 matches a first specific value. When the protection-set value 121 matches a first specific value, even if the address information of the write command points to the register 120, the memory block BK2, or the memory block BK3, the determination circuit 112 does not change the protection-set value 121 according to the write command and does not provide the input command CM_IN to the storage circuit 130. When the protection-set value 121 does not match the first specific value, the determination circuit 112 may change the protection-set value 121 or may provide the input command CM_IN to the storage circuit 130.

In a second protection mode, when the input command CM_IN is a write command and the address information of the write command points to the memory block BK2, BK3 or the register 120, the determination circuit 112 does not provide the input command CM_IN to the storage circuit 130 and does not change the protection-set value 121.

In the first and second protection modes, the determination circuit 112 determines whether to change the data stored in the memory blocks BK1 and BK4~BK6 according to the protection-set value 121. For example, assume that the protection-set value 121 indicates that the memory block BK5 is a protected block. In this case, since the memory blocks BK1 and BK4~BK6 are un-protected blocks, when the address information of the write command points to the memory block BK1, BK4, BK5, or BK6, the determination circuit 112 provides the input command CM_IN to the storage circuit 130. Therefore, the control circuit 131 changes the data stored in the memory block BK1, BK4, BK5, or BK6 according to the data information of the write command. However, when the address information of the write command points to the memory block BK5, since the memory block BK5 is a protected block, the determination circuit 112 does not provide the input command CM_IN to the storage circuit 130. Therefore, the control circuit 131 maintains the data DA to maintain the integrity of the data DA.

Figure 1B:
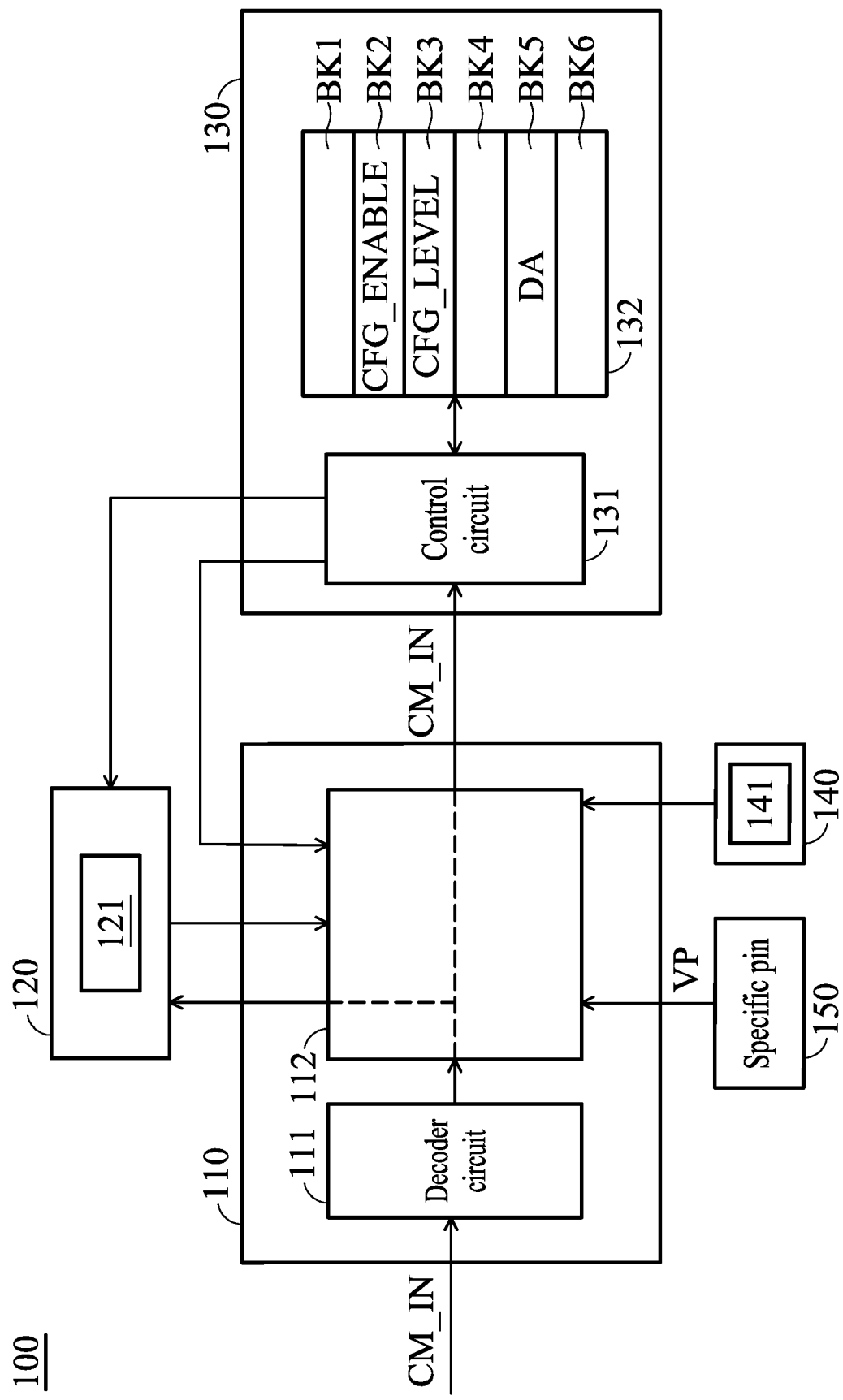
FIG. 1B is a schematic diagram of another exemplary embodiment of the control circuit, in accordance with some embodiments.

FIG. 1B is a schematic diagram of another exemplary embodiment of the control circuit, in accordance with some embodiments. FIG. 1B is similar to FIG. 1A except for the addition of a register 140. The register 140 is independent of the register 130. In this embodiment, the register 140 stores a protection-set value 141. The protection-set value 141 indicates whether the data stored in the register 120 is protected.

For example, in the first protection mode, when the address information of the write command points to the register 120, the write protection logic circuit 110 determines whether the protection-set value 141 matches a second specific value. When the protection-set value 141 matches the second specific value, the indicates that the data stored in the register 120 is protected. Therefore, the write protection logic circuit 110 does not change the protection-set value 121. In this case, the protection-set value 121 is maintained at the first specific value, the data stored in the specific memory block of the storage circuit 130 is not maliciously tampered with. When the protection-set value 141 does not match the second specific value, this indicates that the register 120 is not protected. At this time, if the address information of the write command points to the register 120, the write protection logic circuit 110 replaces the protection-set value 121 with the data information of the write command.

In other embodiments, the write protection logic circuit 110 determines whether the mode-set value CFG_LEVEL matches a third pre-determined value. When the mode-set value CFG_LEVEL matches the third pre-determined value, the write protection logic circuit 110 operates in a third protection mode. In the third protection mode, the write protection logic circuit 110 detects the voltage level VP of a specific pin 150.

When the voltage level VP of the specific pin 150 matches a specific level (e.g., a high level), this indicates that the protection-set value 121 stored in the register 120 is protected. At this time, if the address information of the write command points to the register 120, the write protection logic circuit 110 does not change the protection-set value 121 according to the write command.

However, when the voltage level VP of the specific pin 150 does not match the specific level (e.g., the voltage level VP is a low level), this indicates that the protection-set value 121 is un-protected. At this time, if the address information of the write command points to the register 120, the write protection logic circuit 110 changes the protection-set value 121 according to the data information of the write command.

Additionally, in the third protection mode, the write protection logic circuit 110 does not change the mode-set value CFG_LEVEL and the enable-set value CFG_ENABLE. In this case, even if the address information of the write command points to the memory block BK2 or BK3, the write protection logic circuit 110 does not provide the input command CM_IN to the storage circuit 130.

In the third protection mode, the write protection logic circuit 110 accesses the storage circuit 130 according to the protection-set value 121. For example, assumes that the protection-set value 121 indicates that the memory blocks BK1 and BK5 are protected blocks. In this case, since the memory blocks BK4 and BK6 are un-protected, when the address information of the write command points to the memory block BK4 or BK6, the write protection logic circuit 110 provides the input command CM_IN to the storage circuit 130. The control circuit 131 changes the data stored in the memory block BK4 or BK6 according to the data information of the write command. However, when the address information of the write command points to the memory block BK1 or BK5, since the memory blocks BK1 and BK5 are protected, the write protection logic circuit 110 does not provide the input command CM_IN to the storage circuit 130. Therefore, the control circuit 131 maintains the data stored in the memory blocks BK1 and BK5.

In other embodiments, the write protection logic circuit 110 determines whether the mode-set value CFG_LEVEL matches a fourth pre-determined value. When the mode-set value CFG_LEVEL matches the fourth pre-determined value, the write protection logic circuit 110 operates a fourth protection mode. In the fourth protection mode, the write protection logic circuit 110 detects the voltage level VP of the specific pin 150.

When the voltage level VP of the specific pin 150 matches a specific value (e.g., a high level), this indicates that the register is protected and the storage circuit 130 is not allowed to perform an erase operation. At this time, if the address information of the write command points to the register 120, the write protection logic circuit 110 does not change the protection-set value 121. Furthermore, when a specific event occurs, the storage circuit 130 does not perform an erase operation.

However, when the voltage level VP of the specific pin 150 does not match the specific level (e.g., the voltage level VP is a low level), this indicates that the register 120 is not protected and the storage circuit 130 is allowed to perform an erase operation. At this time, if the address information of the write command points to the register 120, the write protection logic circuit 110 may write the data information of the write command to the register 120 to replace the protection-set value 121. Additionally, when a specific event occurs, the storage circuit 130 enters an erase mode to perform an erase operation.

The present disclosure does not limit how the storage circuit 130 determines whether a specific event occurs. In one embodiment, the storage circuit 130 determines that the specific event occurs according to the value of a specific register (not shown). For example, when a specific event occurs, a CPU (not shown) sets the value of the specific register to a third value, such as 1. Therefore, the storage circuit 130 enters an erase operation. In the erase operation, the storage circuit 130 performs an erase operation to erase the data stored in the memory blocks BK1~BK6 of the memory array 132. However, when the specific event does not occur, the CPU sets the value of the specific register to unequal to the third specific value. Therefore, the storage circuit 130 does not perform an erase operation.

In some embodiments, in the fourth protection mode, when the voltage level VP of the specific pin 150 matches a specific level, even if the specific event occurs, the CPU does not set the value of the specific register to the third specific value. In another embodiment, the write protection logic circuit 110 sets the value of the specific register to a fourth specific value. Since the value of the specific register does not equal to the third specific value, the storage circuit 130 does not perform an erase operation. In this embodiment, even if the specific event occurs, the CPU cannot change the value of the specific register.

The type of specific event is not limited in the present disclosure. In one embodiment, the specific event is that the storage circuit 130 is subject to illegal access or a specific command (e.g., ISP command) is performed. For example, when the user accesses the data stored in the storage circuit 130 multiple times and the accessing number reaches a target value, it means that the storage circuit 130 is subject to illegal access. Therefore, a CPU sets the value of the specific register to a third specific value to trigger the control circuit 131 to perform the erase operation.

In one embodiment, after the control circuit 131 finishes the erase operation, the enable-set value CFG_ENABLE is enabled and is equal to an initial value and the mode-set value CFG_LEVEL matches the first pre-determined value. At this time, the legitimate user may utilize the input command CM_IN to change the enable-set value CFG_ENABLE and the mode-set value CFG_LEVEL and write data into the corresponding memory block (e.g., BK5). When the control circuit 100 is re-powered on, before the write protection logic circuit 110 receives the input command CM_IN, the write protection logic circuit 110 requests the storage circuit 130 to output the enable-set value CFG_ENABLE to the register 120. At this time, the enable-set value CFG_ENABLE serves a new protection-set value 121. Therefore, before the input command CM_IN enters the write protection logic circuit 110, the data stored in the memory blocks BK1~BK6 are protected.

Additionally, in the fourth protection mode, the write protection logic circuit 110 does not change the mode-set value CFG_LEVEL and the enable-set value CFG_ENABLE. In this case, even if the address information of the write command points to the memory block BK2 or BK3, the write protection logic circuit 110 does not transmit the input command CM_IN to the storage circuit 130.

In the fourth protection mode, the write protection logic circuit 110 accesses the storage circuit 130 according to the protection-set value 121. For example, assume that the protection-set value 121 indicates that the memory blocks BK5 and BK6 are protected blocks. In this case, since the memory blocks BK1 and BK4 are un-protected blocks, when the address information of the write command points to the memory block BK1 or BK4, the write protection logic circuit 110 provides the input command CM_IN to the storage circuit 130. Therefore, the control circuit 131 changes the data stored in the memory block BK1 or BK4 according to the data information of the write command. However, when the address information of the write command points to the memory block BK5 or BK6, since the memory blocks BK5 and BK6 are protected blocks, the write protection logic circuit 110 does not provide the input command CM_IN to the storage circuit 130. Therefore, the data stored in the memory blocks BK5 and BK6 is not changed.

In other embodiments, the control circuit 100 comprises a plurality of pins (not shown). One of the pins is capable of serving the specific pin 150. In this case, when the write protection logic circuit 110 operates in the third or fourth protection mode, the write protection logic circuit 110 decodes the mode-set value CFG_LEVEL to obtain pin information and selects one of the pins to serve as the specific pin 150 according to the pin information.

Figure 2:
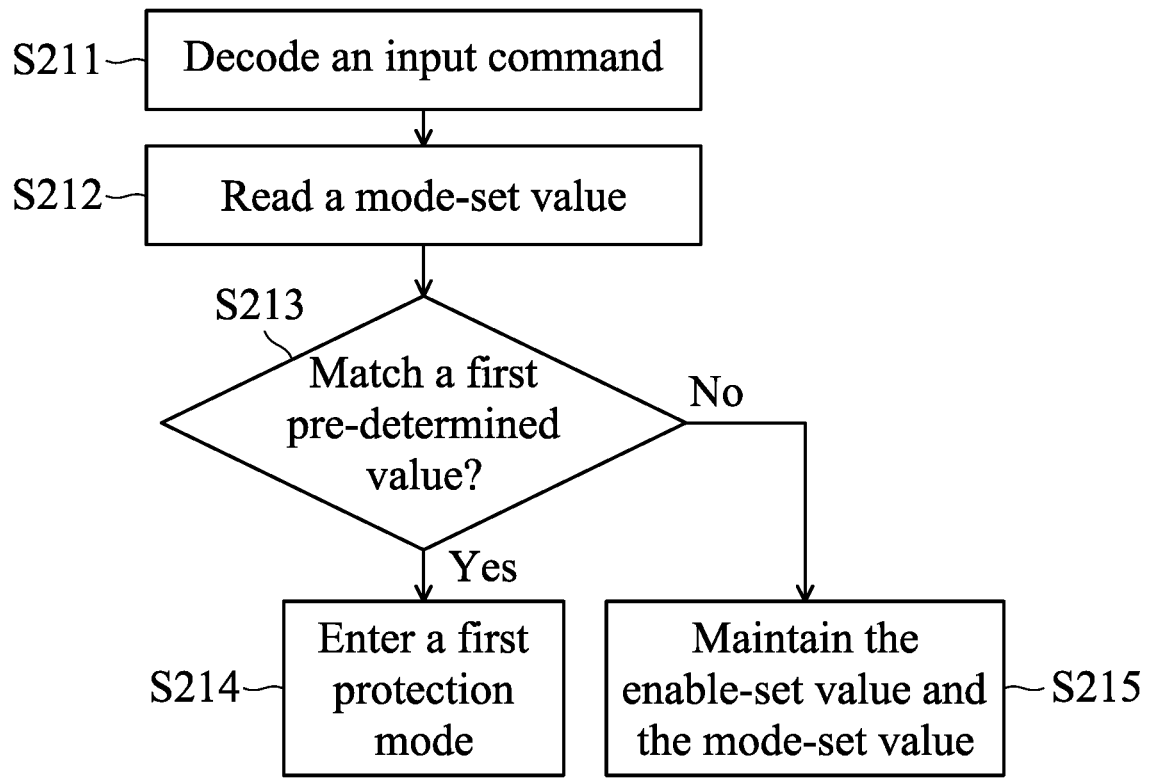
FIG. 2 is a flowchart of an exemplary embodiment of a control method, in accordance with some embodiments.

FIG. 2 is a flowchart of an exemplary embodiment of a control method, in accordance with some embodiments. The control method may take the form of a program code. When the program code is loaded into and executed by a machine, the machine thereby becomes a write protection logic circuit for practicing the control method. The write protection logic circuit is coupled to a storage circuit and a first register. The register is independent of the storage circuit.

In one embodiment, the storage circuit comprises a plurality of memory blocks and stores a mode-set value and an enable-set value. The mode-set value and the enable-set value may be stored in the same memory block or in different memory blocks. The mode-set value indicates the operation mode of the write protection logic circuit. The enable-set value indicates which memory block is protected. For brevity, assume that the enable-set value is stored in a first memory block, and the mode-set value is stored in a second memory block. Furthermore, the first register stores a first protection-set value.

First, an input command is received and decoded (step S211). In one embodiment, step S211 is to decode the input command to obtain the type of the input command (e.g., a read command or a write command). Furthermore, the write protection logic circuit obtains address information and data information according to the input command.

When the input command is a write command, the write protection logic circuit reads the mode-set value stored in the storage circuit (step S212) and determines whether the mode-set value matches a first pre-determined value (step S213). When the mode-set value matches the first predetermined value, the write protection logic circuit enters a first protection mode (step S214).

In the first protection mode, the write protection logic circuit changes at least one of the enable-set value, the mode-set value and the first protection-set value according to the input command (or a write command). For example, when the address information of the write command points to the first or second memory block, the write protection logic circuit provides the input command to the storage circuit. The storage circuit updates the enable-set value stored in the first memory block or the mode-set value stored in the second memory block according to the data information of the input command. When the address information of the write command points to the first register, the write protection logic circuit updates the first protection-set value stored in the first register according to the data information of the write command.

In another embodiment, when the address information of the write command points to the first or second memory block, the write protection logic circuit determines whether to update the enable-set value and the mode-set value according to the first protection-set value. For example, when the first protection-set value matches a first specific value, this indicates that the data stored in the first and the second memory blocks are protected. Therefore, even if the address information of the write command points to the first or second memory block, the write protection logic circuit does not provide the input command to the storage circuit. Therefore, the data stored in the first and second memory blocks are not changed. When the first protection-set value does not match the first protection-set value, this indicates that the data stored in the first and second memory blocks are not protected. Therefore, the write protection logic circuit provides the input command to the storage circuit 130. Then, the storage circuit 130 updates the data stored in the first or second memory block according to the address information of the write command.

In other embodiments, in the first protection mode, the write protection logic circuit reads the second protection-set value stored in a second register. The write protection logic circuit determines whether the second protection-set value matches a second specific value. When the second protection-set value matches the second specific value, this indicates that the first protection-set value stored in the first register is protected. Therefore, even if the address information of the write command points to the first register, the write protection logic circuit does not change the first protection-set value stored in the first register. When the second protection-set value does not match the second specific value, this indicates that the first protection-set value stored in the first register is not protected. Therefore, when the address information of the write command points to the first register, the write protection logic circuit changes the first protection-set value stored in the first register according to the data information of the input command.

When the mode-set value does not match the first pre-determined value, the write protection logic circuit 110 maintains the enable-set value and the mode-set value (step S215). In one embodiment, even if the address information of the write command points to the first or second memory block, the write protection logic circuit 110 does not provide the input command to the storage circuit 130. Therefore, the data stored in the first and second memory blocks are not changed. In other embodiment, step S215 is further to maintain the first protection-set value stored in the first register. In this case, even if the address information of the write command points to the first register, the write protection logic circuit does not change the first protection-set value.

In some embodiments, when the address information of the write command points to a specific memory block of the storage circuit, the write protection logic circuit 110 determines which specific memory blocks of the storage circuit are protected. For example, when the first protection-set value matches a first specific value, this indicates that at least one specific memory block in the storage circuit is protected. Therefore, when the address information of the write command points to the protected specific memory block, the write protection logic circuit does not provide the input command to the storage circuit. Therefore, the data stored in the protected specific memory block does not change.

In other embodiments, when the mode-set value does not match the first pre-determined value, the write protection logic circuit determines whether the mode-set value matches a second pre-determined value. When the mode-set value matches the second pre-determined value, the write protection logic circuit operates in a second protection mode. In the second protection mode, even if the address information of the write command points to the first memory block, the second memory block, or the first register, the enable-set value, the mode-set value and the first protection-set value are not changed.

In some embodiments, when the mode-set value does not match the second pre-determined value, the write protection logic circuit determines whether the mode-set value matches a third pre-determined value. When the mode-set value matches the third pre-determined value, the write protection logic circuit operates in a third protection mode. In the third protection mode, the write protection logic circuit detects the voltage level of a specific pin. When the voltage level of the specific pin matches a specific level, this indicates that the first protection-set value stored in the first register is protected. Therefore, even if the address information of the write command points to the first register, the write protection logic circuit does not change the first protection-set value in the first register. However, when the voltage level of the specific pin does not match the specific level, this indicates that the first register is not protected. Therefore, when the address information of the write command points to the first register, the write protection logic circuit may replace the first protection-set value with the data information of the write command.

Additionally, in the third protection mode, even if the address information of the write command points to the first or second memory block, the data stored in the first and second memory block are not changed. In one embodiment, in the third protection mode, the write protection logic circuit determines whether to change the data stored in a third memory block of the storage circuit 130 according to the first protection-set value of the first register. For example, when the first protection-set value indicates that the data stored in the third memory block is protected, even if the address information of the write command points to the third memory block, the write protection logic circuit does not provide the input command to the storage circuit 130. Therefore, the data stored in the third memory block is not changed. When the first protection-set value indicates that the third memory block is not protected, if the address information of the write command points to the third memory block, the write protection logic circuit provides the input command to the storage circuit. The storage circuit changes the data stored in the third memory block according to the data information of the write command.

In other embodiments, when the mode-set value does not match the third pre-determined value, the write protection logic circuit determines whether the mode-set value matches a fourth pre-determined value. When the mode-set value matches the fourth pre-determined value, the write protection logic circuit operates in a fourth protection mode. In the fourth protection mode, the write protection logic circuit detects the voltage level of a specific pin of a plurality of pins.

In the fourth protection mode, when the voltage level of the specific pin matches a specific level, this indicates that the first protection-set value of the first register is protected and the storage circuit is prohibited from performing an erase operation. At this time, even if the address information of the write command points to the first register, the write protection logic circuit does not change the first protection-set value of the first register. In another embodiment, even if the address information of the write command points to the first or second memory block, the storage circuit does not change the enable-set value and the mode-set value. Additionally, in the fourth protection mode, when the voltage level of the specific pin matches the specific level, even if a specific event occurs, the storage circuit does not perform an erase operation. Therefore, the data stored in the storage circuit are maintained.

In the fourth protection mode, when the voltage level of the specific pin does not match the specific level, this indicates that the first register is un-protected and the storage circuit is allowed to perform an erase operation. Therefore, when the address information of the write command points to the first register, the write protection logic circuit changes the first protection-set value of the first register according to the data information of the write command. In one embodiment, the write protection logic circuit replaces the first protection-set value with the data information of the write command.

Additionally, when a specific event occurs, the storage circuit performs an erase operation to clear all data of the memory blocks. After the erase operation, the storage circuit sets the enable-set value of the first memory block to an initial value and sets the mode-set value of the second memory block to the first pre-determined value. At this time, the user writes data into other memory blocks of the storage circuit. The user sets the enable-set value of the first memory block to protect the data stored in the specific memory block according to the importance of the data.

In other embodiments, in the fourth protection mode, the write protection logic circuit decodes the mode-set value to obtain pin information. The write protection logic circuit selects one of the pins as a specific pin according to the pin information and detects the voltage level of the specific pin.

Since the first protection-set value of the first register and the erase operation are protected, the security of data in the storage circuit is improved. Furthermore, the voltage level of the specific pin is set by a trusted external device, which provide a convenient protection function activated by users. In the different protection modes, the write protection logic circuit provides different protection levels, which provide the design flexibility for users.

Control methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a control circuit and a write protection logic circuit for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a control circuit and a write protection logic circuit for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method applied a write protection logic circuit to adjust at least one of an enable-set value stored in a storage circuit, a mode-set value stored in the storage circuit, and a first protection-set value stored in a first register which is independent of the storage circuit, comprising:
   receiving and decoding an input command;
   reading the mode-set value in response to the input command being a write command;
   determining whether the mode-set value matches a first pre-determined value;
   changing the mode-set value according to data information of the write command in response to the mode-set value matching the first pre-determined value and address information of the write command corresponding to the mode-set value;
   replacing the first protection-set value with the data information of the write command in response to the mode-set value matching the first pre-determined value, the address information of the write command corresponding to the first register, and a second protection-set value not matching a second specific value; and
   maintaining the enable-set value and the mode-set value in response to the mode-set value not matching the first pre-determined value,
   wherein the second protection-set value is stored in a second register which is independent of the storage circuit.

2. The control method as claimed in claim 1, further comprising:
   replacing the enable-set value with the data information of the write command in response to the mode-set value matching the first pre-determined value, the first protection-set value not matching the first specific value, and the address information of the write command corresponding to the enable-set value, and
   replacing the mode-set value with the data information of the write command in response to the mode-set value matching the first pre-determined value, the first protection-set value not matching the first specific value, and the address information of the write command corresponding to the mode-set value.

3. The control method as claimed in claim 2, further comprising:
   maintaining the first protection-set value in response to the second protection-set value matching the second specific value.

4. The control method as claimed in claim 1, further comprising:
   determining whether the mode-set value matches a second pre-determined value;
   maintaining the enable-set value, the mode-set value, and the first protection-set value in response to the mode-set value matching the second pre-determined value.

5. The control method as claimed in claim 4, further comprising:
   determining whether a specific event is occurring;
   in response to the specific event occurring:
   clearing the data;
   setting the enable-set value into an initial value; and
   setting the mode-set value into the first pre-determined value.

6. The control method as claimed in claim 5, further comprising:
   determining whether the mode-set value matches a third pre-determined value;
   detecting a voltage level of a specific pin among a plurality of pins in response to the mode-set value matching the third pre-determined value;
   determining whether the voltage level of the specific pin matches a specific level;
   replacing the first protection-set value with the data information of the write command in response to the voltage level of the specific pin matching the specific level; and
   maintaining the first protection-set value in response to the voltage level of the specific pin not matching the specific level.

7. The control method as claimed in claim 6, further comprising:
   maintaining the enable-set value and the mode-set value in response to the mode-set value matching the third pre-determined value.

8. The control method as claimed in claim 6, further comprising:
   determining whether the mode-set value matches a fourth pre-determined value;
   maintaining the data, the enable-set value, and the mode-set value in response to the mode-set value matching the fourth pre-determined value, the voltage level of the specific pin matching the specific level, and the specific event occurring.

9. The control method as claimed in claim 8, further comprising:
in response to the mode-set value matching the fourth pre-determined value and the voltage level of the specific pin matching the specific level:
maintaining the data, the enable-set value, and the mode-set value; and
replacing the first protection-set value with the data information.

10. The control method as claimed in claim 6, further comprising:
selecting one of the plurality of pins as the specific pin according to pin information of the mode-set value.

11. A control circuit comprising:
a storage circuit storing data, an enable-set value and a mode-set value;
a first register storing a first protection-set value;
a second register storing a second protection-set value; and
a write protection logic circuit determining whether the mode-set value matches a first pre-determined value after receiving a write command,
wherein:
in response to the mode-set value matching the first pre-determined value, the first protection-set value not matching a first specific value, and address information of the write command corresponding to the mode-set value, the write protection logic circuit changes the mode-set value according to data information of the write command,
in response to the mode-set value matching the first pre-determined value, the address information of the write command corresponding to the first register, and the second protection-set value not matching a second specific value, the write protection logic circuit replaces the first protection-set value with the data information of the write command, and
in response to the mode-set value not matching the first pre-determined value, the write protection logic circuit does not change the enable-set value and the mode-set value.

12. The control circuit as claimed in claim 11, wherein in response to the mode-set value matching the first pre-determined value, the first protection-set value not matching the first specific value, and the address information of the write command corresponding to the enable-set value, the write protection logic circuit replaces the enable-set value with the data information of the write command,
in response to the mode-set value matching the first pre-determined value, the first protection-set value not matching the first specific value, and the address information of the write command corresponding to the mode-set value, the write protection logic circuit replaces the mode-set value with the data information of the write command.

13. The control circuit as claimed in claim 11, wherein:
in response to the mode-set value matching the first pre-determined value and address information of the write command corresponding to the first register, the write protection logic circuit determines whether the second protection-set value matches the second specific value,
in response to the second protection-set value matching the second specific value, the write protection logic circuit maintains the first protection-set value.

14. The control circuit as claimed in claim 11, wherein in response to the mode-set value matching the second protection-set value, the write protection logic circuit maintains the enable-set value, the mode-set value, and the first protection-set value.

15. The control circuit as claimed in claim 14, wherein the storage circuit comprises:
a memory array storing the data, the enable-set value, and the mode-set value; and
a control circuit clearing the data, setting the enable-set value to an initial value and setting the mode-set value to the first pre-determined value in response a specific event occurring.

16. The control circuit as claimed in claim 15, further comprising:
a plurality of pins,
wherein:
in response to the mode-set value matching a third pre-determined value, the write protection logic circuit detects a voltage level of a specific pin of the plurality of pins,
in response to the voltage level of the specific pin matching a specific level, the write protection logic circuit replaces the first protection-set value with the data information of the write command.

17. The control circuit as claimed in claim 16, wherein in response to the mode-set value matching the third pre-determined value, the write protection logic circuit maintains the enable-set value and the mode-set value.

18. The control circuit as claimed in claim 16, wherein in response to the mode-set value matching a fourth pre-determined value, the voltage level of the specific pin matching the specific level, and the specific event occurring, the write protection logic circuit maintains the data, the enable-set value, and the mode-set value.

19. The control circuit as claimed in claim 18, wherein in response to the mode-set value matching the fourth pre-determined value and the voltage level of the specific pin matching the specific level, the write protection logic circuit maintains the data, the enable-set value, and the mode-set value and replaces the first protection-set value with the data information.

20. The control circuit as claimed in claim 16, wherein the write protection logic circuit selects one of the plurality of pins as the specific pin according to pin information of the mode-set value.

* * * * *